Oct. 6, 1953  G. W. ALLEN  2,654,392
VALVE MECHANISM

Filed Dec. 30, 1947  2 Sheets-Sheet 1

INVENTOR.
GEORGE W. ALLEN
BY
H. O. Clayton
ATTORNEY

Oct. 6, 1953 G. W. ALLEN 2,654,392
VALVE MECHANISM
Filed Dec. 30, 1947 2 Sheets-Sheet 2

INVENTOR.
GEORGE W. ALLEN
BY
H. O. Clayton
ATTORNEY

Patented Oct. 6, 1953

2,654,392

UNITED STATES PATENT OFFICE 2,654,392

VALVE MECHANISM

George W. Allen, South Bend, Ind., assignor to Bendix Aviation Corporation, South Bend, Ind., a corporation of Delaware Application December 30, 1947, Serial No. 794,738

2 Claims. (Cl. 137—622)

1

This invention relates generally to fluid pressure actuators for change speed mechanisms and more particularly to actuators including a fluid motor for selectively actuating the shifting mechanism of multi-speed drive axles of automotive vehicles.

My invention is particularly directed to a valve mechanism adapted to control the motor of the above identified actuator and to this end it is an object of my invention to provide a simple, compact, and easily serviced double three way valve for controlling a double acting fluid pressure motor.

Yet another object of my invention is to provide a double three way valve for controlling a fluid pressure motor the opening and closing operations of the valve being effected by spring means serving to quickly and positively actuate the movable part or parts of the valve.

A further object is to provide a manually or power operated dead center spring operating mechanism for opening and closing a valve suitable for controlling a double acting fluid pressure operated motor.

Yet another object of my invention is to provide a snap action mechanism of relatively few parts for effecting a reciprocatory movement of a rod such as a valve operating rod; and said mechanism is particularly characterized by the employment of a plurality of tension springs operative to move the rod when the springs are moved past their dead center position with respect to a certain fulcrum.

The above and other objects and features of the invention will appear more fully hereinafter from a consideration of the following description taken in connection with the accompanying drawings wherein one embodiment of the invention is illustrated by way of example.

Figure 1:
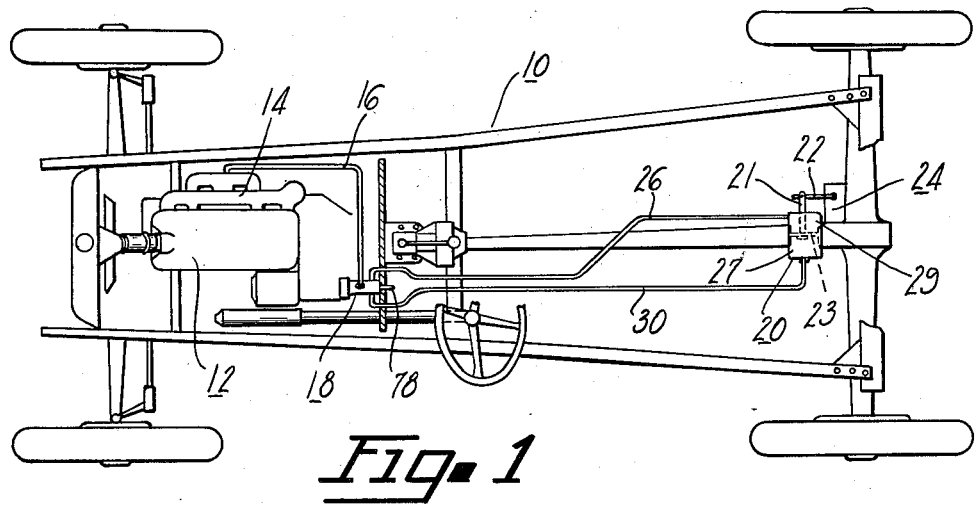
Figure 1 is a top plan view of the chassis of an automotive vehicle with parts removed for simplicity and showing a power plant embodying the valve mechanism constituting my invention.

Referring to the drawing disclosing a preferred embodiment of my invention I have shown at 10 generally the chassis of an automotive vehicle the internal combustion engine of the vehicle being indicated by the reference numeral 12. Communicating with the intake manifold 14 of the engine is a vacuum conduit 16 extending to a double three way valve mechanism 18 constituting my invention. This mechanism 18, which is hereinafter defined as a valve unit, serves to control the operation of a double acting pressure differential operated motor 20 the power element 23 of which is operably connected, by a rod 21, to a crank 22. This crank constitutes a part of a two speed axle mechanism 24 which mechanism, by the actuation of the crank, is established in either a high speed drive condition or a low speed drive condition.

The motor 20, no claim to which is made in this application, preferably consists of a double ended casing which houses the power element 23 said element serving, together with the casing, to provide two control compartments 27 and 29. The compartment 29 is connected, by a conduit 26, with a control compartment 28 of the valve unit 18; and the control compartment 27 of the motor is connected, by a conduit 30, with a control compartment 32 of the valve unit. When the motor 20 is energized its power element 23 moves in one direction or the other thereby effecting an angular movement of the crank 22 to operate the two speed axle. As will be described in greater detail hereinafter the energization of the motor 20 may be effected by partially evacuating one or the other of the compartments 27 and 29 the remaining compartment being at the time vented to the atmosphere.

Figure 2:
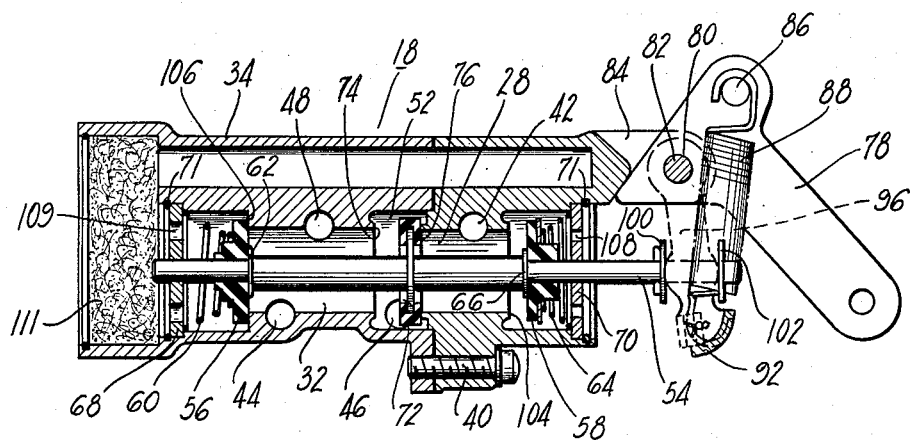
Figure 2 is a sectional view of the valve mechanism of my invention said view disclosing the mechanism in detail.
Figure 3:
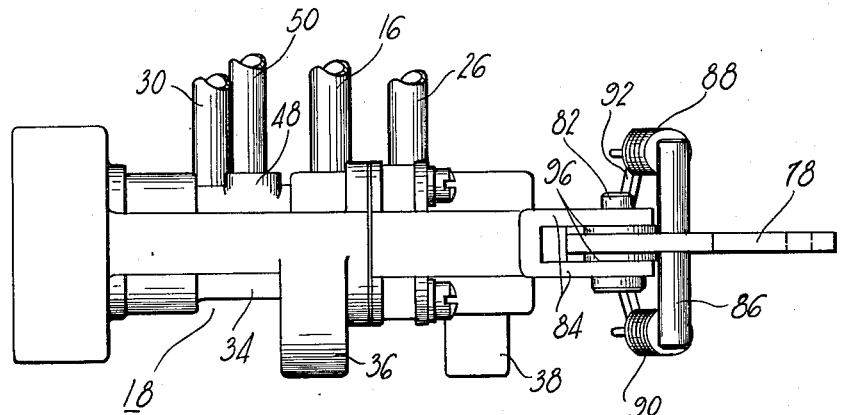
Figure 3 is a plan view of the valve mechanism of my invention.
Figure 4:
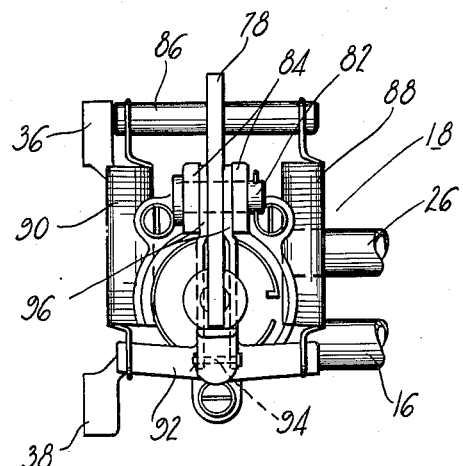
Figure 4 is an end view of the valve mechanism of my invention.

Describing now the details of my invention, that is the valve unit 18, this unit includes a two part casing 34 which may be mounted, by pads 36 and 38, Figure 3, to any convenient part of the chassis of the vehicle. The two parts of the casing 34 are preferably secured together by means of screws 40, Figure 2, and the casing is ported at 42 to receive one end of the conduit 26, at 44 to receive one end of the conduit 30, at 46 to receive one end of the vacuum conduit 16, and at 48 to receive one end of a conduit 50 connected to a speedometer controlling fluid pressure motor, not shown.

As is disclosed in Figure 2 the two part valve casing 34 is bored to provide parts of the aforementioned compartments 28 and 32; and one part of the casing is counterbored at its inner end to provide valve seats 74 and 76 referred to hereinafter. A valve rod 54 extends within the valve compartments 28 and 32, said rod having slidably mounted thereon a disk shaped valve member 56 and a disk shaped valve member 58. The valve members 56 and 58 cooperate with the bored portions of the casing and a disk like valve member 72 to provide the compartments 28 and 32. The member 56 is preferably biased, by a spring 60, into contact with a stop 62; and the member 58 is biased, by a spring 64, into contact with a stop 66. The stops 62 and 66 are fixedly secured to, that is non-slidably mounted on, the rod 54; and the springs 60 and 64 abut, respectively, stops 68 and 70 which are preferably secured within the valve casing by means of locking rings 71. The aforementioned vacuum controlling valve member 72 is preferably fixedly mounted on the valve rod 54 said member being adapted to seat at 74 or at 76 in the operation of the valve mechanism.

Describing now that part of the valve mechanism operable to actuate the valve members 56, 58 and 72, this mechanism preferably includes a manually operated two armed lever 78 pivotally mounted at 80 upon a pin 82. The latter member is mounted at its ends in spaced apart flanges 84 extending from the body of the casing 34 said casing constituting a support member. A pin 86, mounted in the end of the upper arm of the lever 78 and paralleling the pin 82, serves as a pivotal mounting for tension springs 88 and 90 which straddle the lever 78 and its mounting; and the lower ends of said springs are pivotally secured to a cross piece 92 to which is pivotally secured at 94, a two part crank arm 96. This crank arm 96 is pivotally mounted, at its upper end, upon the pin 82 and the two parts of the arm straddle the lever 78. The two parts of the crank arm also straddle the valve operating rod 54 and are positioned between stop members 100 and 102 secured to said rod.

Describing the operation of the valve operating means, clockwise rotation of the shift lever 78 to the position disclosed in Figure 2, serves to move the tension springs 88 and 90 past their dead center position with respect to the fulcrum of the lever 78 on the pin 82; and this operation serves, by a snap action, to effect a counterclockwise rotation of the crank arm 96 about the pin 82. The latter operation serves to very quickly move the valve rod 54 to the right, Figure 2, to the position disclosed in said figure the valve member 58 in this operation being moved by the stop member 66 off of a seat 104. The valve member 56 is, by this operation, moved by the spring 60 to seat upon a valve seat 106; and the valve member 72 moves to the right to its seat 76 to interconnect the motor compartment 27 with the intake manifold. The motor compartment 29 is by this operation, vented to the atmosphere via the conduit 26, valve port 42, valve compartment 28 and openings 108 in the stop 70.

Now when the engine 12 is idling the intake manifold 14 becomes a source of vacuum accordingly with the operation just described the motor 20 is energized to actuate the crank 22 to establish the transmission 24 in say its high gear setting.

To establish the low gear setting of the transmission 24 the driver will move the lever 78 upwardly, Figure 2; and this counterclockwise operation of the lever serves to move the springs 88 and 90 to the left, Figure 2, past their aforementioned dead center position. Having moved past the dead center position the springs will then operate to move the valve rod 54 to the left, Figure 2, to seat the valve member 72 upon its seat 74, permit the spring 64 to seat upon the valve member 58 upon the seat 104, and unseat the valve 56 the latter operation being effected by the operation of the stop member 62. This operation serves to connect the motor compartment 29 with the source of vacuum via conduit 26, port 42, compartment 28 and conduit 16, and vent the motor compartment 27 to the atmosphere via conduit 30, valve compartment 32, openings 109 in the stop 68 and the open end portion of the valve casing 34 said portion being preferably filled with an air filter material 111. The motor 20 is thus again energized the piston 23 being again subjected to a differential of pressure; and this operation serves to effect a low gear operation of the transmission 24, the crank 22 being rotated in a clockwise direction, Figure 1. The above described shifter operations of the motor 20 are facilitated by a release of the accelerator of the vehicle, not shown, which operation not only increases the degree of vacuum in the intake manifold but also reverses the engine torque to unload the driving gear of the transmission, that is the two speed axle mechanism 24.

There is thus provided a very simple, compact and effective double three way valve mechanism adapted to control double acting fluid pressure motor such for example as the motor employed to actuate a two speed axle mechanism of an automotive vehicle. The trigger like over center operation of the springs 88 and 90 serve to quickly and positively operate the valve members 56, 58 and 72 to effect an operation of the motor 20. It is also to be noted that the mechanism for effecting the reciprocable operation of the valve operating rod 54, that is the lever 78, springs 88 and 90, cross piece 92 and crank arm 96, may also be employed to actuate the control rod of any mechanism where a quick and positive operation of the rod is required.

I claim:

1. A valve mechanism including a casing bored to provide portions of a plurality of control compartments, a reciprocable valve operating rod extending through the casing, a disk shaped valve member fixedly mounted on said rod, two disk shaped valve members slidably mounted on said rod and cooperating with parts of the bored portions of the casing and with the aforementioned disk shaped valve member to provide the control compartments, two stop members mounted in the ends of the casing, said members being provided with openings to permit the flow of air therethru and into the control compartments, spring means contacting one of said stop members and serving to bias one of said latter valve members to a certain position, other spring means contacting the other of said stop members and serving to bias the other of said latter valve members to a certain position, a stop member fixedly mounted on the rod and operative, when the rod is moved in one direction, to move one of the slidably mounted valve members, another stop member fixedly mounted on the rod and operative, when the rod is moved in the opposite direction, to move the other of the slidably mounted valve members, together with means mounted on the end of the casing for actuating the rod to effect an operation of the valve mechanism.

2. A valve mechanism including a casing bored to provide portions of a plurality of control compartments, a reciprocable valve operating rod extending through the casing, a disc shaped valve member fixedly mounted on said rod, two valve members slidably mounted on said rod and cooperating with parts of the bored portions of the casing and with the aforementioned disk shaped valve member to provide the control compartments; two stop members mounted in the ends of the casing, said members being provided with openings to permit the flow of air therethru and into the control compartments, means interposed between said stop members and the slidably mounted valve members and serving to bias said valve members to a certain position; a stop member fixedly mounted on the rod and operative, when the rod is moved in one direction, to move one of the slidably mounted valve members, another stop member fixedly mounted on the rod and operative, when the rod is moved in the opposite direction, to move the other of the slidably mounted valve members, together with means, including two tension springs and a lever mechanism for operating said springs, for actuating the rod to effect an operation of the valve mechanism.

GEORGE W. ALLEN.

References Cited in the file of this patent

UNITED STATES PATENTS

| Number | Name | Date |
|---|---|---|
| Re. 17,304 | Knaak | May 28, 1929 |
| 520,148 | Turner | May 22, 1894 |
| 1,661,466 | Cook | Mar. 6, 1928 |
| 1,847,073 | Ernst | Mar. 1, 1932 |
| 2,049,839 | Helm | Aug. 4, 1936 |
| 2,127,064 | Levy | Aug. 16, 1938 |
| 2,310,350 | Bavord | Feb. 9, 1943 |
| 2,365,748 | Curtis | Dec. 26, 1944 |
| 2,370,076 | Rosenberger | Feb. 20, 1945 |
| 2,385,733 | Schroer | Sept. 25, 1945 |

FOREIGN PATENTS

| Number | Country | Date |
|---|---|---|
| 278,814 | Germany | of 1914 |